United States Patent
Wang et al.

(10) Patent No.: US 9,611,150 B2
(45) Date of Patent: Apr. 4, 2017

(54) SAPO-34 ZEOLITE HAVING DIGLYCOLAMINE AS TEMPLATING AGENT AND SYNTHESIS METHOD FOR THE ZEOLITE

(71) Applicant: Dalian Institute of Chemical Physics, Chinese Academy of Sciences, Dalian, Liaoning (CN)

(72) Inventors: Dehua Wang, Liaoning (CN); Peng Tian, Liaoning (CN); Zhongmin Liu, Liaoning (CN); Dong Fan, Liaoning (CN); Ying Zhang, Liaoning (CN); Xiong Su, Liaoning (CN)

(73) Assignee: DALIAN INSTITUTE OF CHEMICAL PHYSICS, CHINESE ACADEMY OF SCIENCES, Dalian, Liaoning (CN)

( * ) Notice: Subject to any disclaimer, the term of this patent is extended or adjusted under 35 U.S.C. 154(b) by 173 days.

(21) Appl. No.: 14/647,973

(22) PCT Filed: Dec. 10, 2012

(86) PCT No.: PCT/CN2012/086280
§ 371 (c)(1),
(2) Date: May 28, 2015

(87) PCT Pub. No.: WO2014/089740
PCT Pub. Date: Jun. 19, 2014

(65) Prior Publication Data
US 2015/0315031 A1    Nov. 5, 2015

(51) Int. Cl.
*C01B 39/54* (2006.01)
*B01J 29/85* (2006.01)
(Continued)

(52) U.S. Cl.
CPC ........... *C01B 39/54* (2013.01); *B01J 20/18* (2013.01); *B01J 20/3071* (2013.01);
(Continued)

(58) Field of Classification Search
CPC  C01B 39/48; C01B 39/54; B01J 29/85; B01J 20/3078; B01J 20/18
See application file for complete search history.

(56) References Cited

U.S. PATENT DOCUMENTS 4,440,871 A    4/1984  Lok et al.
4,499,327 A    2/1985  Kaiser

FOREIGN PATENT DOCUMENTS

CN    1088483 A    6/1994

OTHER PUBLICATIONS

Treacy et al, Collection of Simulated XRD Powder Patterns for Zeolites, 4th ed., Elsevier, (2001).*

(Continued)

*Primary Examiner* — David M Brunsman
(74) *Attorney, Agent, or Firm* — Nath, Goldberg & Meyer; Joshua B. Goldberg; Tanya E. Harkins

(57) ABSTRACT

The present invention provides a SAPO-34 molecular sieve, whose chemical composition in the anhydrous state is expressed as: $mDGA \cdot (Si_xAl_yP_z)O_2$; wherein DGA is diglycolamine, distributing in the cages and pores of said molecular sieve; m is the molar number of the template agent diglycolamine per one mole of $(Si_xAl_yP_z)O_2$, and m is from 0.03 to 0.25; x, y, z respectively represents the molar number of Si, Al, P, and x is from 0.01 to 0.30, and y is from 0.40 to 0.60, and z is from 0.25 to 0.49, and x+y+z=1. Said SAPO-34 molecular sieve can be used as an acid-catalyzed reaction catalyst, such as a methanol to olefins reaction (Continued)

catalyst. The present invention also concerns the application of said SAPO-34 molecular sieve in adsorption separation of $CH_4$ and $CO_2$.

9 Claims, 1 Drawing Sheet

(51) Int. Cl.
*B01J 20/18* (2006.01)
*B01J 37/04* (2006.01)
*B01J 37/08* (2006.01)
*B01J 37/06* (2006.01)
*B01J 20/30* (2006.01)
*C01B 37/08* (2006.01)
*B01J 35/02* (2006.01)

(52) U.S. Cl.
CPC ........... *B01J 20/3078* (2013.01); *B01J 29/85* (2013.01); *B01J 37/04* (2013.01); *B01J 37/06* (2013.01); *B01J 37/08* (2013.01); *C01B 37/08* (2013.01); *B01J 35/023* (2013.01)

(56) References Cited

OTHER PUBLICATIONS

Michael W. Anderson, et al., "In Situ Solid-state NMR Studies of the Catalytic Conversion of Methanol on the Molecular Sieve SAPO-34", J. Phys. Chem. 1990, 94, 2730-2734.

\* cited by examiner

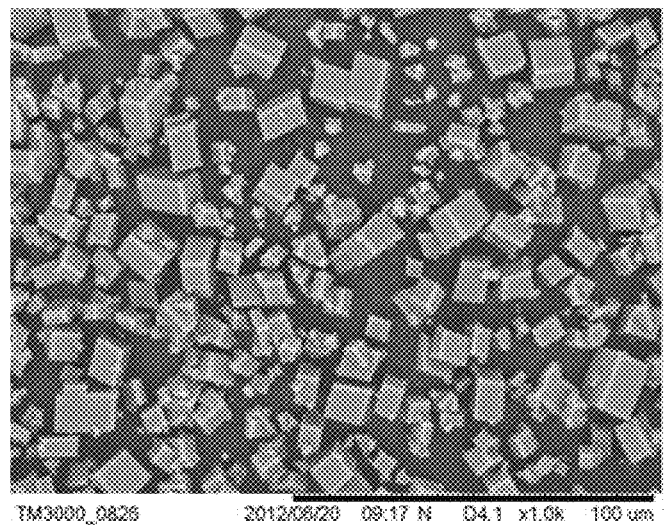

SAPO-34 ZEOLITE HAVING DIGLYCOLAMINE AS TEMPLATING AGENT AND SYNTHESIS METHOD FOR THE ZEOLITE

This is a National Phase Application filed under 35 U.S.C. 371 as a national stage of PCT/CN2012/086280, filed Dec. 10, 2012, the content of which is hereby incorporated by reference in its entirety.

TECHNICAL FIELD

The present invention belongs to the field of SAPO molecular sieve, and specifically concerns a SAPO-34 molecular sieve and method for preparing the same.

BACKGROUND

The Union Carbide Corporation (UCC) researched and developed a series of novel silicoaluminophosphate molecular sieves SAPO-n in 1984 (U.S. Pat. No. 4,440,871 and U.S. Pat. No. 4,499,327), which were prepared by using organic amines as a template agent and using hydrated alumina, phosphoric acid and silica sol as an aluminum source, a silicon source and a phosphorus source, respectively. Firstly, a complex of organic amine/silicoaluminophosphate with microporous structure was obtained by a hydrothermal crystallization method, and then the template agent (organic amine) was removed by calcination to obtain the SAPO-n molecular sieves. Among this kind of molecular sieves, SAPO-34 with CHA-type framework has shown an excellent catalytic activity and selectivity in methanol to olefins (MTO) process, due to its proper pore structure, proper Brønsted acid property, higher specific surface area, preferable adsorption performance, high thermal stability, high hydrothermal stability and the like.

SAPO-34 is a molecular sieve with chabazite-type (CHA) framework containing 8-member ring ellipsoidal cage and 3-dimensional channel, which is formed by stacking of double six-rings according to ABC sequence. SAPO-34 is microporous molecular sieve with a pore size of 0.38×0.38 nm. Space group of SAPO-34 is R3m belonging to trigonal crystal system (J. Phys. Chem., 1990, 94: 2730). SAPO-34 is formed by Si, Al, P and O whose composition change at some range, generally in the order of n(Si)<n(P)<n(Al).

SAPO-34 molecular sieve is generally produced by a hydrothermal synthesis process which uses water as the solvent and is conducted in a sealed autoclave. The silicon source may be chosen from silica sol, active silica and orthosilicate esters. The aluminum source may be chosen from active alumina, pseudo boehmite and alkoxy aluminum. Preferable silicon source and aluminum source are silica sol and pseudo boehmite. Phosphorus source is generally 85% phosphoric acid. The template agent commonly used comprises tetraethyl ammonium hydroxide (TEAOH), morpholine (MOR), piperidine, isopropylamine triethylamine diethylamine (TEA), dipropylamine (DEA), and the like, or a mixture thereof. The structural-directing agent partly affects the microstructure, elemental composition, morphology of synthesized molecular sieve, thus producing an impact on the catalytic performance of synthesized molecular sieve.

In the present invention, diglycolamine firstly is used as structure-directing agent for the hydrothermal synthesis of pure SAPO-34 molecular sieve. The synthetic SAPO-34 molecular sieve has shown an excellent catalytic performance in catalytic reaction and a good gas absorption separation performance.

DISCLOSURE

An object of the present invention is to provide a SAPO-34 molecular sieve, whose chemical composition in the anhydrous state is expressed as: $mDGA \cdot (Si_xAl_yP_z)O_2$: wherein DGA is diglycolamine, distributing in the cages and pores of said molecular sieve; m is the molar number of diglycolamine per one mole of $(Si_xAl_yP_z)O_2$, and m is from 0.03 to 0.25: x, y, z respectively represents the molar number of Si, Al, P, and x is from 0.01 to 0.30, and y is from 0.40 to 0.60, and z is from 0.25 to the molar number of Si, Al, P, and x is from 0.01 to 0.30, and v is from 0.40 to 0.60, and z is from 0.25 to 0.49, and x+y+z=1. Preferably, x is from 0.07 to 0.26, and v is from 0.42 to 0.52, and z is from 0.28 to 0.45, and x+y+z=-1. The diffraction peaks are shown in Table 2, according to the X-ray diffraction analysis or said SAPO-34 molecular sieve. The X-ray diffraction analysis result of said SAPO-34 molecular sieve at least includes the diffraction peaks as the following table:

| No. | 2θ | d(Å) |
| --- | --- | --- |
| 1 | 9.4445 | 9.36452 |
| 2 | 15.942 | 5.55943 |
| 3 | 17.7583 | 4.99471 |
| 4 | 22.9708 | 3.87175 |
| 5 | 29.428 | 3.03525 |

Another object of the present invention is to provide a method for preparing SAPO-34 molecular sieve.

Another object of the present invention is to provide a SAPO-34 molecular sieve prepared using the above method and catalysts prepared from the same for acid-catalyzed reaction or oxygenates to olefins reaction.

Another object of the present invention is to provide a material used for adsorption separation of $CH_2/CO_2$.

The technical problem to be solved in the present invention is that the SAPO-34 molecular sieve is prepared in high purity under hydrothermal or solvothermal conditions, using diglycolamine as the structure-directing agent and using the phosphorus source, the silicon source and the aluminum source employed in usual molecular sieve synthesis as raw materials.

The present invention is characterized in including the preparation steps as follows:

(a) deionized water, a silicon source, an aluminum source, a phosphorus source and DGA are mixed according to a certain ratio, and an initial gel mixture with following molar ratio is obtained:

$SiO_2/Al_2O_3$ is from 0.05 to 2.5:
$P_2O_5/Al_2O_3$ is from 0.5 to 1.5:
$H_2O/Al_2O_3$ is from 5 to 200:
$DGA/Al_2O_3$ is from 2.5 to 30, DGA is diglycolamine:

(b) the initial gel mixture obtained in said step (a) is transferred into an autoclave, then sealed and heated to crystallization temperature range from 150° C. to 220° C., crystallized for crystallization time range from 5 h to 72 h under the autogenous pressure:

(c) after finishing the crystallization, the solid product is separated, washed to neutral using deionized water and dried to obtain said SAPO-34 molecular sieve.

In said step (a), the silicon source is one or more selected from silica sol, active silica, orthosilicate esters and metakaolin: the aluminum source is one or more selected from aluminum salts, activated alumina, aluminum alkoxide and metakaolin: the phosphorus source is one or more selected from phosphoric acid, diammonium hydrogen phosphate, ammonium dihydrogen phosphate, organophosphorous compounds and phosphorus oxides.

In said step (b), the crystallization is carried out statically or dynamically.

In the initial gel mixture obtained in said step (a), the molar ratio of $SiO_2/Al_2O_3$ is preferable from 0.15 to 2.0.

In the initial gel mixture obtained in said step (a), the molar ratio of $P_2O_5/Al_2O_3$ is preferable from 0.8 to 1.5.

In the initial gel mixture obtained in said step (a), the molar ratio of $H_2O/Al_2O_3$ is preferable from 10 to 150.

In the initial gel mixture obtained in said step (a), the molar ratio of $DGA/Al_2O_3$ is preferable from 5.5 to 16.

The present invention also refers to a catalyst for acid-catalyzed reaction, which is obtained by calcining at least one of said SAPO-34 molecular sieves or at least one of the SAPO-34 molecular sieves prepared by said methods, at a temperature from 400 to 700° C. in air.

The present invention also refers to a catalyst for oxygenates to olefins reaction, which is obtained by calcining at least one of said SAPO-34 molecular sieves or at least one of the SAPO-34 molecular sieves prepared by said methods, at a temperature from 400 to 700° C. in air.

The present invention also refers to a material used for adsorption separation of $CH_4/CO_2$, which is obtained by calcining, at least one of said SAPO-34 molecular sieves or at least one of the SAPO-34 molecular sieves prepared by said methods, at a temperature from 400 to 700° C. in air.

The present invention can bring the advantages including:
(1) obtaining a SAPO-34 molecular sieve using diglycolamine as the template agent.
(2) the SAPO-34 molecular prepared by said method in present invention having excellent catalytic performance in the reaction of converting methanol or dimethyl ether to light olefins.
(3) the SAPO-34 molecular prepared by said method in present invention having excellent adsorption separation selectivity of $CH_4$ and $CO_2$.

BRIEF DESCRIPTION OF THE DRAWINGS

FIG. 1 is a scanning electron microscope image of the sample prepared in Example 1 (SEM).

SPECIFIC EMBODIMENTS OF THE INVENTION

The elemental analysis was determined using Magix 2424 X-ray fluorescence spectrometer (XRF) produced by Philips.

The X-ray powder diffraction analysis (XRD) was determined using X'Pert PRO X-ray diffractometer produced by PANalytical, with Cu Kα radiation (λ=0.15418 nm), operated at 40 KV and 100 mA.

The SEM morphology analysis was determined using KYKY-AMRAY-1000B scanning electron microscope produced by Scientific Instruments Factory of Chinese Academy of Sciences.

Carbon-13 nuclear magnetic resonance analysis ($^{13}C$ MAS NMR) was determined using Infinity plus 400WB Solid-state nuclear magnetic resonance spectrometer produced by Varian, with a BBO MAS probe operating at a magnetic field strength of 9.4 T.

CHN elemental analysis was determined using German Vario EL Cube elemental analyzer.

The present invention will be described in details by Examples, but the present invention is not limited to these Examples.

Examples 1

The amount of ingredients, the crystallization condition and the sample elemental composition are shown in Table 1. The synthesis process was as follows: 14 g of pseudoboehmite (with $Al_2O_3$ mass percent of 72.5%) and 79.2 g of deionized water were mixed homogeneously, and then 5.96 g of silica sol (with $SiO_2$ mass percent of 30.24%) was added and stirred to smooth, and then 23.06 g of phosphoric acid (with $H_3PO_4$ mass percent of 85%) was added by droplets. 31.5 g dialycolamine (abbreviated as DGA, with mass percent of 99%) were added into the mixture, stirring to smooth to obtain the initial gel mixture. The initial gel mixture was transferred into a stainless steel autoclave. The molar ratio of the compositions in the initial gel mixture was $3.0DGA:0.30SiO_2:1Al_2O_3:1P_2O_5:50H_2O$.

The autoclave was put into a stove and temperature programmed heated to 200° C. dynamically crystallized for 48 h. After finishing the crystallization, the solid product was centrifugal separated, washed and dried at 100° C. in air to obtain the raw powder sample. The raw powder sample was detected with XRD and XRD data were shown in Table 2, indicating that the raw powder sample prepared had the structural characteristics as same as SAPO-34 molecular sieve.

The CHN elemental analysis of the raw powder sample obtained in Example 1 was detected, and the chemical compositions of the racy powder sample were obtained by normalization of the CHN elemental analysis results and the inorganic elemental analysis results detected by XRF.

TABLE 1

The list of amount of ingredients and crystallization conditions of the molecular sieves*

| Example | Molar amount of DGA | Aluminum source and molar amount of $Al_2O_3$ thereof | Phosphorus source and molar amount of $P_2O_5$ thereof | Silicon source and molar amount of $SiO_2$ thereof | $H_2O$ | Crystallization Temperature | Crystallization Time | Chemical Composition |
|---|---|---|---|---|---|---|---|---|
| 1 | 0.3 mol | pseudoboehmite 0.10 mol | phosphoric acid 0.10 mol | silica sol 0.03 mol | 5.0 mol | 200° C. | 48 h | 0.19DGA•$(Si_{0.13}Al_{0.49}P_{0.38})O_2$ |
| 2 | 0.59 mol | aluminium isopropoxide 0.1 mol | phosphoric acid 0.10 mol | silica sol 0.005 mol | 1.6 mol | 180° C. | 48 h | 0.12DGA•$(Si_{0.01}Al_{0.50}P_{0.49})O_2$ |

TABLE 1-continued

The list of amount of ingredients and crystallization conditions of the molecular sieves*

| Example | Molar amount of DGA | Aluminum source and molar amount of $Al_2O_3$ thereof | Phosphorus source and molar amount of $P_2O_5$ thereof | Silicon source and molar amount of $SiO_2$ thereof | $H_2O$ | Crystallization Temperature | Crystallization Time | Chemical Composition |
|---|---|---|---|---|---|---|---|---|
| 3 | 0.25 mol | aluminium isopropoxide 0.1 mol | phosphoric acid 0.10 mol | silica sol 0.15 mol | 0.5 mol | 200° C. | 24 h | $0.10DGA \cdot (Si_{0.30}Al_{0.45}P_{0.25})O_2$ |
| 4 | 0.38 mol | γ-alumina 0.1 mol | phosphoric acid 0.10 mol | silica sol 0.10 mol | 8.3 mol | 200° C. | 24 h | $0.08DGA \cdot (Si_{0.25}Al_{0.41}P_{0.34})O_2$ |
| 5 | 0.5 mol | aluminum sulfate 0.1 mol | phosphoric acid 0.05 mol | active silica 0.25 mol | 2.6 mol | 190° C. | 48 h | $0.25DGA \cdot (Si_{0.28}Al_{0.46}P_{0.26})O_2$ |
| 6 | 0.3 mol | aluminium chloride 0.1 mol | phosphoric acid 0.15 mol | ethyl orthosilicate 0.08 mol | 1.2 mol | 200° C. | 24 h | $0.22DGA \cdot (Si_{0.20}Al_{0.35}P_{0.45})O_2$ |
| 7 | 1.0 mol | pseudoboehmite 0.1 mol | phosphoric acid 0.09 mol | silica sol 0.04 mol | 5.1 mol | 200° C. | 24 h | $0.21DGA \cdot (Si_{0.10}Al_{0.49}P_{0.41})O_2$ |
| 8 | 0.8 mol | aluminium isopropoxide 0.1 mol | phosphoric acid 0.15 mol | silica sol 0.01 mol | 10 mol | 200° C. | 24 h | $0.17DGA \cdot (Si_{0.06}Al_{0.60}P_{0.34})O_2$ |
| 9 | 0.26 mol | pseudoboehmite 0.1 mol | ammonium dihydrogen phosphate 0.10 mol | silica sol 0.06 mol | 6.6 mol | 220° C. | 5 h | $0.16DGA \cdot (Si_{0.14}Al_{0.47}P_{0.39})O_2$ |
| 10 | 1.5 mol | pseudoboehmite 0.1 mol | diammonium hydrogen phosphate 0.10 mol | active silica 0.06 mol | 2.2 mol | 200° C. | 24 h | $0.18DGA \cdot (Si_{0.11}Al_{0.49}P_{0.40})O_2$ |
| 11 | 2.0 mol | aluminum sulfate 0.1 mol | diammonium hydrogen phosphate 0.15 mol | silica sol 0.07 mol | 8.8 mol | 200° C. | 18 h | $0.15DGA \cdot (Si_{0.16}Al_{0.47}P_{0.37})O_2$ |
| 12 | 0.3 mol | pseudoboehmite 0.1 mol | diammonium hydrogen phosphate 0.12 mol | silica sol 0.12 mol | 6.5 mol | 180° C. | 24 h | $0.12DGA \cdot (Si_{0.25}Al_{0.40}P_{0.35})O_2$ |
| 13 | 0.4 mol | pseudoboehmite 0.1 mol | phosphoric anhydride 0.13 mol | active silica 0.03 mol | 12 mol | 210° C. | 18 h | $0.19DGA \cdot (Si_{0.15}Al_{0.49}P_{0.36})O_2$ |
| 14 | 0.39 mol | pseudoboehmite 0.1 mol | phosphoric acid 0.10 mol | silica sol 0.03 mol | 4.5 mol | 190° C. | 12 h | $0.19DGA \cdot (Si_{0.15}Al_{0.49}P_{0.36})O_2$ |
| 15 | 0.39 mol | aluminium isopropoxide 0.1 mol | phosphoric acid 0.10 mol | tetramethyl orthosilicate 0.03 mol | 6.5 mol | 150° C. | 72 h | $0.22DGA \cdot (Si_{0.15}Al_{0.46}P_{0.39})O_2$ |
| 16 | 0.30 mol | pseudoboehmite 0.1 mol | trimethyl phosphine 0.10 mol | silica sol 0.03 mol | 6.5 mol | 210° C. | 15 h | $0.17DGA \cdot (Si_{0.13}Al_{0.48}P_{0.37})O_2$ |
| 17 | 0.35 mol | pseudoboehmite 0.1 mol | triethyl phosphine 0.10 mol | silica sol 0.03 mol | 6.5 mol | 170° C. | 60 h | $0.19DGA \cdot (Si_{0.13}Al_{0.48}P_{0.39})O_2$ |
| 18 | 0.8 mol | pseudoboehmite 0.1 mol | phosphoric acid 0.10 mol | silica sol 0.20 mol | 3.0 mol | 200° C. | 24 h | $0.20DGA \cdot (Si_{0.26}Al_{0.44}P_{0.30})O_2$ |
| 19 | 3.00 mol | pseudoboehmite 0.1 mol | phosphoric acid 0.10 mol | silica sol 0.03 mol | 20 mol | 200° C. | 24 h | $0.21DGA \cdot (Si_{0.15}Al_{0.50}P_{0.35})O_2$ |

TABLE 2

XRD result of the sample obtained in Example 1

| No. | 2θ | d(Å) | 100 × I/I° |
|---|---|---|---|
| 1 | 9.4445 | 9.36452 | 66.76 |
| 2 | 12.7935 | 6.91968 | 15.26 |
| 3 | 13.9312 | 6.35701 | 6.2 |
| 4 | 15.942 | 5.55943 | 43.18 |
| 5 | 17.7583 | 4.99471 | 21.85 |
| 6 | 18.9695 | 4.67843 | 2.26 |
| 7 | 20.5083 | 4.33075 | 100 |
| 8 | 20.9495 | 4.24053 | 4.27 |
| 9 | 21.9655 | 4.04662 | 16.19 |
| 10 | 22.2848 | 3.98936 | 8.18 |
| 11 | 24.9225 | 3.57281 | 70.93 |
| 12 | 25.7931 | 3.45415 | 22.85 |
| 13 | 27.5092 | 3.24245 | 6.1 |
| 14 | 28.1221 | 3.17316 | 4.82 |

TABLE 2-continued

XRD result of the sample obtained in Example 1

| No. | 2θ | d(Å) | 100 × I/I° |
|---|---|---|---|
| 15 | 29.428 | 3.03525 | 3.39 |
| 16 | 30.4672 | 2.93405 | 42.98 |
| 17 | 31.0098 | 2.88394 | 25.27 |
| 18 | 32.2329 | 2.77725 | 1.71 |
| 19 | 33.4612 | 2.67805 | 4.49 |
| 20 | 34.3373 | 2.61171 | 7.7 |
| 21 | 35.9729 | 2.49663 | 6.8 |
| 22 | 39.5319 | 2.27967 | 3.7 |

TABLE 2-continued

XRD result of the sample obtained in Example 1

| No. | 2θ | d(Å) | 100 × I/I° |
|---|---|---|---|
| 23 | 43.2766 | 2.0907 | 3.73 |
| 24 | 47.4623 | 1.91563 | 4.54 |
| 25 | 49.3238 | 1.84761 | 2.58 |
| 26 | 50.6098 | 1.80364 | 6.32 |
| 27 | 53.0197 | 1.7272 | 4.94 |
| 28 | 55.2438 | 1.66281 | 2.49 |
| 29 | 58.1695 | 1.58595 | 0.83 |
| 30 | 59.3794 | 1.5565 | 1.83 |

Examples 2 to 19

The amount of ingredients and the crystallization conditions were shown in Table 1, and the synthesis processes were the same as Example 1.

The samples were detected with XRD. XRD data of samples were similar to Table 2, which showed that each corresponding peak had the same peak position and the ±10% difference of peak intensity, indicating the samples prepared had the structural characteristics as same as SAPO-34 molecular sieve.

The elemental analysis results of the samples were shown in Table 1.

The raw powder samples obtained in Examples 1 to 10 were detected with $^{13}C$ MAS NMR analysis respectively, comparing the results with the $^{13}C$ MAS NMR standard spectrum of diglycolamine, only the resonance peak of diglycolamine was observed.

Example 20

The sample obtained in Example 1 was calcined at 550° C. for 4 hours in air, then pressed, crushed and sieved to 20-40 mesh. 5.0 g of the sample was added into a batch reactor loaded 30 mL of ethanol to carry out an ethanol dehydration reaction evaluation. The reaction was carried out at 150° C. under stirring. The result showed that ethanol conversion reached 92% and the selectivity for ether in products was 92%.

Example 21

The sample obtained in Example 1 was calcined at 550° C. for 4 hours in air, then pressed, crushed and sieved to 20-40 mesh. 1.0 g, of the sample was weighted and loaded into a fixed bed reactor to carry out a methanol to olefins reaction evaluation. The sample was activated at 550° C. for 1 hour in nitrogen gas and reduced to 450° C. to perform a reaction. Methanol was carried by nitrogen gas with a flow rate of 40 ml/min and the Weight Hour Space Velocity of the methanol was 4.0 $h^-$. The reaction products were analyzed by an on-line gas chromatograph (Varian3800. HD detector, capillary column was PoraPLOT Q-HT). The result was shown in Table 3.

TABLE 3

The reaction result of methanol to olefins on the sample

| Sample | Life (min) | Selective (mass %) * | | | | | | | |
|---|---|---|---|---|---|---|---|---|---|
| | | $CH_4$ | $C_2H_4$ | $C_2H_6$ | $C_3H_6$ | $C_3H_8$ | $C_4^+$ | $C_5^+$ | $C_2H_4 + C_3H_6$ |
| Example 1 | 126 | 1.38 | 43.14 | 0.55 | 37.60 | 1.03 | 12.17 | 4.13 | 80.74 |

Example 22

The sample obtained in Example 10 was calcined at 550° C. for 4 hours in air. The adsorption isotherms or $CO_2$ and $CH_4$ were detected using Micrometrics ASAP 2020. Before being detected, the sample was degassed at 350° C. for 4 hour under vacuum conditions. The adsorption isotherms were detected at the temperature or 25° C. and the pressure or 101 kpa.

TABLE 4

The adsorption separation result of $CO_2/CH_4$ on the sample

| Sample | Adsorption Capacity (mmol/g) | | $CO_2/CH_4$ |
|---|---|---|---|
| | $CO_2$ | $CH_4$ | |
| Example 10 | 3.82 | 0.20 | 19.1 |

The invention claimed is:

1. A SAPO-34 molecular sieve whose chemical composition in the anhydrous state is expressed as:

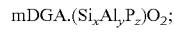

mDGA.$(Si_xAl_yP_z)O_2$;

wherein,

DGA is diglycolamine; m is the molar number of diglycolamine per one mole of $(Si_xAl_yP_z)O_2$, and m is from 0.03 to 0.25;

x, y, z respectively represents the molar number of Si, Al, P, and x is from 0.01 to 0.30, and y is from 0.40 to 0.60, and z is from 0.25 to 0.49, and x+y+z=1.

2. A SAPO-34 molecular sieve according to claim 1, wherein the X-ray diffraction spectrogram of said SAPO-34 molecular sieve includes the diffraction peaks at following peak positions:

| No. | 2θ |
|---|---|
| 1 | 9.4445 |
| 2 | 15.942 |
| 3 | 17.7583 |
| 4 | 22.9708 |
| 5 | 29.428. |

3. A method for preparing said SAPO-34 molecular sieve according to claim 1, including the steps as follows:
(a) deionized water, a silicon source, an aluminum source, a phosphorus source and DGA are mixed according to a certain ratio, and an initial gel mixture with following molar ratio is obtained:
$SiO_2/Al_2O_3$ is from 0.05 to 2.5;
$P_2O_5/Al_2O_3$ is from 0.5 to 1.5;
$H_2O/Al_2O_3$ is from 5 to 200;
$DGA/Al_2O_3$ is from 2.5 to 30, DGA is diglycolamine;
(b) the initial gel mixture obtained in said step (a) is transferred into an autoclave, then sealed and heated to crystallization temperature range from 150° C. to 220° C., crystallized for crystallization time range from 5 h to 72 h under the autogenous pressure;
(c) after finishing the crystallization, the solid product is separated, washed to neutral using deionized water and dried to obtain said SAPO-34 molecular sieve.

4. A method according to claim 3, wherein in the initial gel mixture obtained in said step (a), the silicon source is one or more selected from silica sol, active silica, orthosilicate esters and metakaolin; the aluminum source is one or more selected from aluminum salts, activated alumina, aluminum alkoxide and metakaolin; the phosphorus source is one or more selected from phosphoric acid, diammonium hydrogen phosphate, ammonium dihydrogen phosphate, organophosphorous compounds and phosphorus oxides.

5. A method according to claim 3, wherein in said step (b), the crystallization is carried out statically or dynamically.

6. A method according to claim 3, wherein in the initial gel mixture obtained in said step (a), the molar ratio of organic amine DGA to $Al_2O_3$ $SDA/Al_2O_3$ is from 5.5 to 16.

7. A catalyst for acid-catalyzed reaction, which is obtained by calcining at least one of said SAPO-34 molecular sieves according to claim 1, at a temperature from 400 to 700° C. in air.

8. A catalyst for oxygenates to olefins reaction, which is obtained by calcining at least one of said SAPO-34 molecular sieves according to claim 1, at a temperature from 400 to 700° C. in air.

9. A material used for adsorption separation of $CH_4/CO_2$, which is obtained by calcining at least one of said SAPO-34 molecular sieves according to claim 1, at a temperature from 400 to 700° C. in air.

* * * * *